(12) United States Patent
Shoemaker et al.

(10) Patent No.: US 7,516,495 B2
(45) Date of Patent: *Apr. 7, 2009

(54) HARDWARE-BASED SOFTWARE AUTHENTICATOR

(75) Inventors: Charles H. Shoemaker, Seattle, WA (US); Colby D Boles, Seattle, WA (US); John E Elsbree, Redmond, WA (US); Mark J Weinberg, Kirkland, WA (US); Mark S Newell, Seattle, WA (US); Michelle V Niethammer, Bellevue, WA (US); David Fulmer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 580 days.

This patent is subject to a terminal disclaimer.

(21) Appl. No.: 10/938,323

(22) Filed: Sep. 10, 2004

(65) Prior Publication Data

US 2006/0059572 A1    Mar. 16, 2006

(51) Int. Cl.
*H04L 9/00* (2006.01)
(52) U.S. Cl. .............................. 726/29; 726/2; 726/26; 726/27
(58) Field of Classification Search ........................ None
See application file for complete search history.

(56) References Cited

U.S. PATENT DOCUMENTS

| 5,208,853 | A |  | 5/1993 | Armbruster et al. |
| 5,293,422 | A |  | 3/1994 | Loiacono |
| 5,349,643 | A |  | 9/1994 | Cox et al. |
| 5,365,587 | A |  | 11/1994 | Campbell et al. |
| 5,748,960 | A |  | 5/1998 | Fischer |
| 5,825,883 | A | * | 10/1998 | Archibald et al. ............. 705/53 |
| 5,944,821 | A |  | 8/1999 | Angelo |
| 5,966,691 | A |  | 10/1999 | Kibre et al. |
| 5,968,136 | A |  | 10/1999 | Saulpaugh et al. |
| 6,175,924 | B1 |  | 1/2001 | Arnold |
| 6,223,288 | B1 |  | 4/2001 | Byrne |
| 6,298,025 | B1 |  | 10/2001 | McPherson et al. |
| 6,665,797 | B1 | * | 12/2003 | Keung ........................ 713/193 |
| 7,290,288 | B2 | * | 10/2007 | Gregg et al. ................... 726/28 |
| 2002/0049679 | A1 | * | 4/2002 | Russell et al. ................. 705/52 |

FOREIGN PATENT DOCUMENTS

EP    0849658    6/1998

OTHER PUBLICATIONS

"The protection racket", Watts, W., .EXE Magazine, vol. 5, Issue 5, Oct. 1990. pp. 12-13, 15-16, and 18.
"Single-copy security", Holmes, B., Software Protection, Systems International, vol. 16, No. 10, Oct. 1988, pp. 55-56.
"Aladdin knowledge Systems: securing the global village", Kuchinskas, S., EContent, vol. 26, No. 5, May 2003, pp. 50-51.
Microsoft Computer Dictionary, Microsoft Press, 2002, fifth edition, pp. 276 and 378.

* cited by examiner

*Primary Examiner*—Pramila Parthasarathy
(74) *Attorney, Agent, or Firm*—Lee & Hayes, PLLC

(57) ABSTRACT

Upon authentication via a required multi-function hardware component, coupled to a computer system with one or more computer-readable media, having a software product embodied thereon, one implementation, described herein, conditionally blocks or grants access to the software functionality of that software product on that computer system.

17 Claims, 4 Drawing Sheets

HARDWARE-BASED SOFTWARE AUTHENTICATOR

TECHNICAL FIELD

This invention generally relates to computers and software which is executed thereon. More particularly, the invention relates to restricting usage of software and/or hardware on a computer.

BACKGROUND

Software piracy is the unauthorized copying, use and distribution of software (e.g., an application program or an operating system). According to Business Software Alliance (BSA):

Software is one of the most valuable technologies of the Information Age, running everything from PCs to the Internet. Unfortunately, because software is so valuable, and because computers make it easy to create an exact copy of a program in seconds, software piracy is widespread. From individual computer users to professionals who deal wholesale in stolen software, piracy exists in homes, schools, businesses and government. Software pirates not only steal from the companies that make the software, but, with less money for research and development of new software, all users are hurt. That's why all software piracy—even one copy you make for a friend—is illegal.

As the number of PCs and Internet use grow, the incidence of software piracy is growing, too. The Business Software Alliance believes new technologies should enhance ways to access and distribute copyrighted works legally, not illegally.

A recent report (the Global Software Piracy Study: www.bsa.org/globalstudy), published by the BSA and International Data Corp (IDC), indicates that 2003 annual worldwide losses to the industry are over $29 billion, which is more than double the previous year's losses. The study also indicates that about 36 percent of software installations worldwide are pirated copies.

John Gantz, Chief Research Officer at IDC, said, "Unfortunately, we found that high market growth regions also tend to be high piracy regions, such as China, India and Russia. If the piracy rate in emerging markets—where people are rapidly integrating computers into their lives and businesses—does not drop, the worldwide piracy rate will continue to increase." The BSA/IDC report stated that there were a number of provincial differences that played a role in piracy. Some of those included local-market size, the availability of pirated software, the strength of copyright laws, and the cultural differences regarding intellectual property rights.

Copy protection is one approach used to combat software piracy. Copy protection is a technical protection measure designed to prevent duplication of copyrighted works. However, from a technical standpoint, it would seem impossible to completely prevent all users from making copies of such media as CDs.

Another common approach is to require a user to activate the software by providing information that only a user should know, that the user acquires from the packaging contents, and/or from an activation center. For example, a serial number, a number that comes with the software, may be required to install a software program. A phone activation code may be required. The user calls to register the product and to receive phone activation. An on-line activation may be required. The user is required to connect to the Internet and type in a serial number so the software can "call home" and notify the manufacturer as to who has installed the software and where, and to prevent other users from installing the software if they attempt to use the same serial number.

Still another approach is the use of a "dongle," which is a piece of dedicated hardware that is plugged into the computer in order to execute dongle-activated software. When the dongle is present, the software will run properly; when it is not, the program will run in a restricted mode or refuse to start.

Since the dedicated hardware adds extra cost for the software publisher, dongles are uncommon for low-end software packages (e.g., video games) and are found mostly in high-end software packages costing several thousand dollars (e.g., CAD/CAM).

Dongles tie up a port on the host machine. This has been ameliorated to some extent by the adoption of USB, but it is still a serious drawback. To get around this, most practical dongles include a replacement port, so as to become an inline device.

In fields where dongle-protected software is common, users often need more than one such application installed on a given computer. Manufacturers claim that multiple dongles can be successfully stacked or daisy-chained, but operational problems with stacked dongles are common. The number of dongles can also become physically problematic.

There is the obvious problem of losing the dongle, rendering the protected software useless until a replacement can be obtained. This is particularly likely if one needs to swap dongles for different applications.

SUMMARY

Upon authentication via a required multi-function hardware component, coupled to a computer system with one or more computer-readable media, having a software product embodied thereon, one implementation, described herein, conditionally blocks or grants access to the software functionality of that software product on that computer system.

DESCRIPTION OF THE DRAWINGS

The same numbers are used throughout the drawings to reference like elements and features.

DETAILED DESCRIPTION

The following description sets forth techniques that introduce a significant deterrent to piracy of software, especially in emerging markets. The techniques may be implemented in many ways, including (but not limited to) program modules, general- and special-purpose computing systems, dedicated electronics and hardware, and as part of one or more computer networks.

An exemplary implementation of these techniques may be referred to as an "exemplary hardware-based software authenticator" and is described below.

Exemplary Hardware-Based Authentication System

Especially in emerging markets, software piracy poses a fundamental threat to software companies. While the cost of duplicating software is near zero, the cost of duplicating hardware provides a significant deterrent to piracy.

Generally, the exemplary hardware-based software authenticator is directed towards validating the presence of a required multi-function hardware component and conditionally blocking or granting access to software functionality based on hardware authentication. In other words, a software product on a computer utilizing the exemplary hardware-based software authenticator will only be fully operational if it detects the presence of a validated multi-function device attached to the computer.

Figure 1:
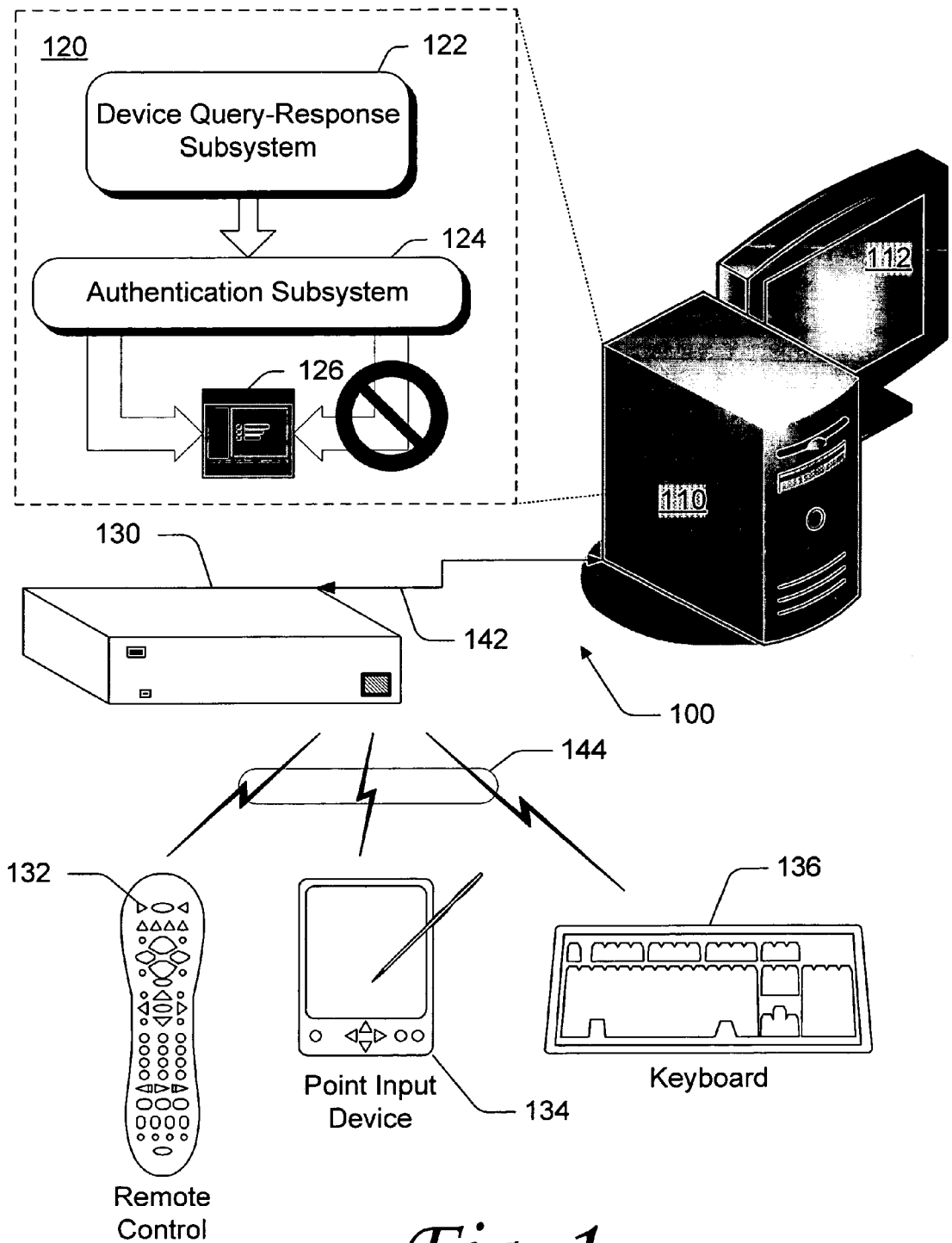
FIG. 1 is a block diagram of an implementation described herein.

FIG. 1 illustrates a hardware-based authentication system 100 which operates on a computer 110 (which has a monitor 112). The exemplary hardware-based software authenticator may be implemented by the system 100, described herein. The components of the system 100 may be implemented in software, hardware, or in a mixture of both. Generally, the system 100 either grants or denies access to the functionality of a software product based upon authentication offered by a computer-coupled multifunction hardware device.

The system 100 may be part of a server or a client. It may be stand-alone or networked with other computers. This system 100 may be implemented on a general purpose computer, a specific purpose computer, a portable computer, a personal digital assistant (PDA), an appliance, special purpose electronics, or other such computing and electronics equipment.

The components of system 100 are shown inside the dashed outline 120 in FIG. 1. This dashed outline 120 represents one or more computer-readable memories of the computer. The depicted system 100 includes a device query-response subsystem 122, an authentication subsystem 124, and a subject software product 126.

The computer 110 on which the system 100 operates is coupled to an authenticating computer-coupled, multi-function hardware device 130. This coupling (indicated at 142) may be a direction connection (e.g., USB, serial, parallel, etc.) or a network connection (e.g., Ethernet, LAN, WAN, Internet, etc.). Furthermore, this coupling may be wired or wireless (Wi-Fi, IR, etc.). Indeed, in some alternative embodiments, this device may be incorporated within the case of the computer 110 itself.

Instead of being a single purpose device, like a "dongle," this multi-function hardware device 130 performs functions in addition to the function of security (i.e., authentication). For example, this device may be used an IR (infrared) receiver as part of a multimedia computing system. This device may also be part of another computer peripheral device, such as a printer, external hard drive, camera, personal digital assistant (PDS), portable music player, portable media device, scanner, media reader, and the like.

There may be other devices coupled to the multi-function hardware device 130. For example, those other devices may include a remote control 132, a point input device 134, and a keyboard 136 coupled to the hardware device 130. The coupling (indicated at 144) between the multi-function hardware device 130 and the other devices may be a direction connection (e.g., USB, serial, parallel, etc.) or a network connection (e.g., Ethernet, LAN, WAN, Internet, etc.). Furthermore, this coupling may be wired or wireless (Wi-Fi, IR, etc.).

Instead of the authentication function being performed in the multi-function hardware device 130 alone, the other devices may work in cooperation with the hardware device 130 to perform the authentication function. Alternatively, these other devices may perform the authentication function, themselves.

The hardware performing the authentication in the device could range from a security chip on the motherboard to a multipurpose chip within an existing device to a chip within a 2-way remote control and several other hardware components.

Operation of Exemplary Hardware-Based Authentication System

Upon the initiation of software product 126, the system 100 is activated. The device query-response subsystem 122 initiates a query-response interaction with the computer-coupled, multi-function hardware device 130. In other words, it queries the device. This query may utilize a well-known public key infrastructure (PKI) to validate that the device is a specific one designated to authorize use of the software product 126.

Once a response is received, the authentication subsystem 124 determines if it is valid. If so, then the user is granted full access to the full functionality of the software product 126. If it is not valid, then the user receives either no access or only restricted access to the functionality of the software product 126. This may occur also if the authentication subsystem 124 has not receive any response within a defined time period.

If the hardware device 130 is not detected or validated, the user is presented with an error message that blocks access to associated software functionality. The user may be free to use all other aspects of the operating system except that which requires validation of the companion hardware.

In cooperation with a hardware manufacturer, a software publisher reduces the threat of software piracy by controlling the production and distribution of the required computer-coupled, multi-function hardware devices (e.g., device 130). With the exemplary hardware-based software authenticator, the software publisher utilizes authentication modules that will authenticate the presence of the multi-function hardware device. Unlike uni-purpose "dongles," the hardware required for the exemplary hardware-based software authenticator is a multipurpose device that also serves an authentication role.

Methodological Implementation

Figure 2:
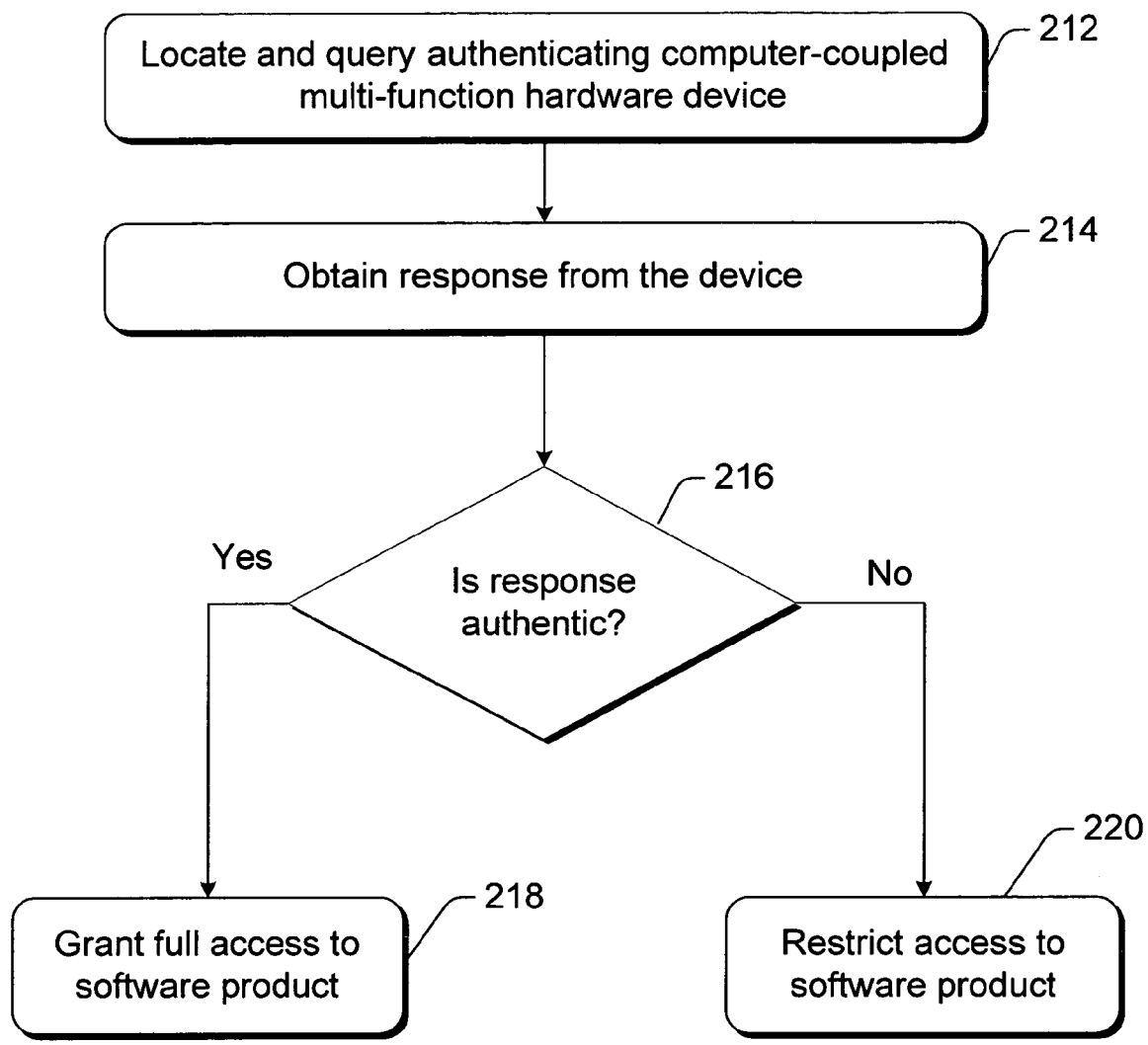
FIG. 2 is a flow diagram showing a methodological implementation described herein.

FIG. 2 shows a methodological implementation of the system 100. This methodological implementation may be performed in software, hardware, or a combination thereof. For ease of understanding, the method steps are delineated as separate steps; however, these separately delineated steps should not be construed as necessarily order dependent in their performance.

At 212 of FIG. 2, the system 100 locates the computer-coupled, multi-function device 130 and queries it. This action may be initiated by the invocation of a particular software product. This query utilizes a well-known public key infrastructure (PKI) to validate that the device is a specific one designated to authorize use of the software product 126.

At 214, the system 100 waits for an authenticated response from the device 130. At 216, it determines if that response is valid and authenticated. If so, this process proceeds to block 218. Otherwise, it proceeds to block 220. It will also proceed to block 220 if it receives no response.

At 218, the system 100 grants access to the full functionality of the software product 126.

If the received response is not authenticated or no response is received in a given time period, then, at block 220, the system 100 denies access to the full functionality of the software product. Alternatively, it may limit how long the user has access to full functionality. Also, it may provide a notification to the user as to the nature of and reason for its limited access.

Other Implementations

Figure 3:
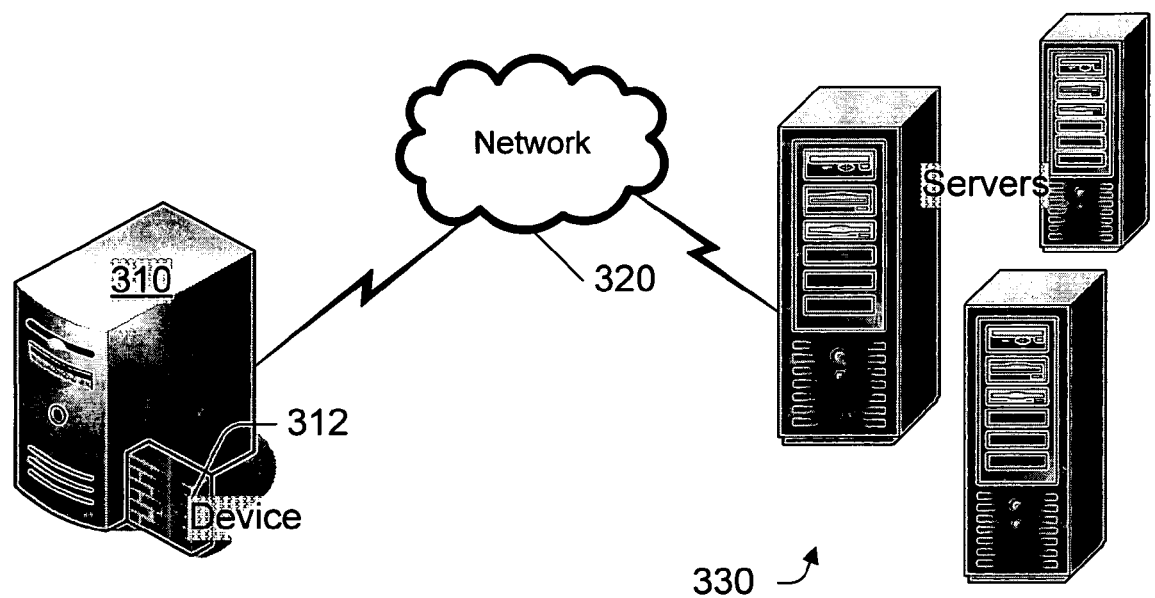
FIG. 3 is a block diagram of an alternative implementation described herein.

In a contemplated alternative implementation shown in FIG. 3, the exemplary hardware-based software authenticator is extended to include a server-side validation component. FIG. 3 shows a client computer 310 and its computer-coupled, multi-function hardware device 312, coupled to one or more servers 330 via a network 320 (e.g., LAN, WAN, the Internet, etc.).

With this alternative implementation of FIG. 3, the server 330 includes the functionality, described above, of the device query-response subsystem 122, an authentication subsystem 124, and a subject software product 126. However, the required hardware device 312 that it validates exists on the client computer 310, rather than on the server 330. Instead of software product, the validation may be required for access to associated data or components such as electronic program guide (EPG) data.

With the server-side validation component of this alternative implementation, the remote server requires a query-response validation of the coupled hardware before the download of valuable data (e.g., EPG data) or access to a valuable portal of data. Users of pirated software would be blocked from a highly valuable aspect of the product.

A data portal, for which access may be policed by the exemplary hardware-based software authenticator, may include the following exemplary options:

Data in the port is dynamic, and it is integrated into the main navigation and start menu;

Portal is the launching point for signed content partners (such as music and video download and streaming services, ISVs, etc.);

Portal could be the location of valuable incentive programs for end users and OEM customers (for example, visit portal and receive $50 in free movie rentals from online movie services).

Furthermore, the client computer 310 may be continuously connected to the internet or may access the internet on some other interval. If the computer 310 is always connected, the exemplary hardware-based software authenticator may be used to validate local hardware against a continually-changing server-side algorithm.

In another alternative implementation, the exemplary hardware-based software authenticator could be integrated into the logon paradigm and become a critical component of authentication for the entire operating system. In this approach, a Kernel-level check would require the presence of the hardware for system logon to succeed.

Incorporation of the components of the system 100 into the Kernel-level of the operating system will make it more difficult for a digital pirate to crack the authentication module therein.

In still another alternative implementation, to make the exemplary hardware-based software authenticator more difficult to defeat, critical functionality could be run through the required hardware, further ensuring its presence. For example, if the Digital Rights Management (DRM) capabilities of the DVR (digital video recorder) file format checked for the presence of the hardware, no recorded TV shows would be shown if the hardware was not present.

In further still another alternative implementation, to make the exemplary hardware-based software authenticator more difficult to defeat, the intervals and locations of any hardware or server checks could be modified by release (such as major release, QFE, or service pack) or dynamically. An example would be to delay the hardware or Internet-based authentication by a long interval (e.g., four months) to thwart any short-term testing that pirates might perform on illegal versions of the software.

Exemplary Computing System and Environment

Figure 4:
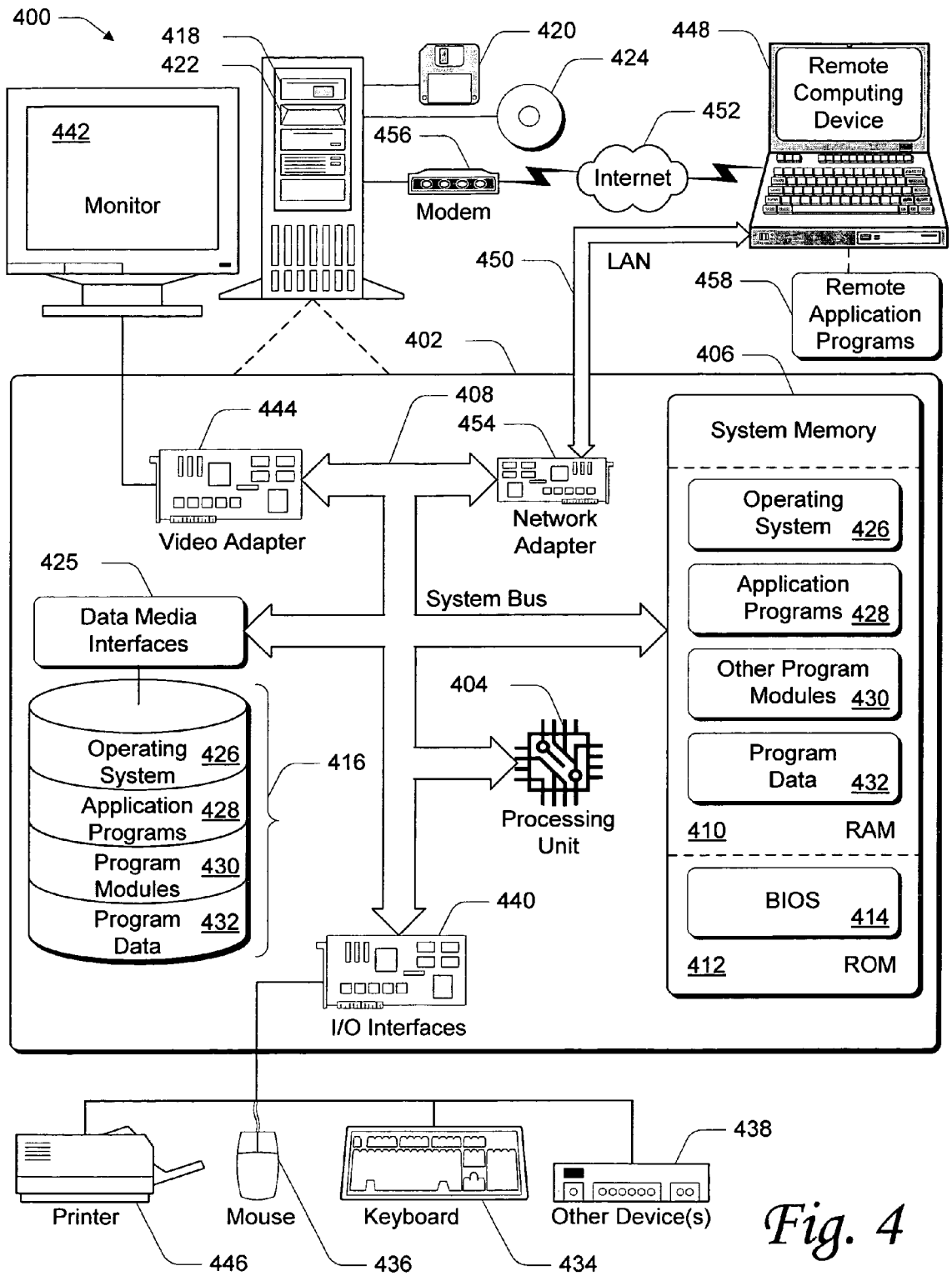
FIG. 4 is an example of a computing operating environment capable of (wholly or partially) implementing at least one embodiment described herein.

FIG. 4 illustrates an example of a suitable computing environment 400 within which an exemplary hardware-based software authenticator, as described herein, may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The exemplary hardware-based software authenticator may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary hardware-based software authenticator may be described in the general context of processor-executable instructions, such as program modules, being executed by a computer. Generally, program modules include routines, programs, objects, components, data structures, etc. that perform particular tasks or implement particular abstract data types. The exemplary hardware-based software authenticator may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 may include, but are not limited to, one or more processors or processing units 404, a system memory 406, and a system bus 408 that couples various system components, including the processor 404, to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 402 typically includes a variety of processor-readable media. Such media may be any available media that is accessible by computer 402 and includes both volatile and non-volatile media, removable and non-removable media.

The system memory 406 includes processor-readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 may be connected to the system bus 408 by one or more interfaces (not shown).

The disk drives and their associated processor-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 416 magnetic disk 420, optical disk 424, ROM 412, and/or RAM 410, including, by way of example, an operating system 426, one or more application programs 428, other program modules 430, and program data 432.

A user may enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408 but may be connected by other interface and bus structures, such as a parallel port, game port, or a universal serial bus (USB).

A monitor 442 or other type of display device may also be connected to the system bus 408 via an interface, such as a video adapter 444. In addition to the monitor 442, other output peripheral devices may include components, such as speakers (not shown) and a printer 446, which may be connected to computer 402 via the input/output interfaces 440.

Computer 402 may operate in a networked environment using logical connections to one or more remote computers, such as a remote computing device 448. By way of example, the remote computing device 448 may be a personal computer, a portable computer, a server, a router, a network computer, a peer device or other common network node, and the like. The remote computing device 448 is illustrated as a portable computer that may include many or all of the elements and features described herein, relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. Such networking environments may be wired or wireless.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which may be internal or external to computer 402, may be connected to the system bus 408 via the input/output interfaces 440 or other appropriate mechanisms. It is to be appreciated that the illustrated network connections are exemplary and that other means of establishing communication link(s) between the computers 402 and 448 may be employed.

In a networked environment, such as that illustrated with computing environment 400, program modules depicted, relative to the computer 402 or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computing device 402, and are executed by the data processor(s) of the computer.

Processor-Executable Instructions

An implementation of an exemplary hardware-based software authenticator may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 400 in which an exemplary hardware-based software authenticator may be implemented. Specifically, the exemplary hardware-based software authenticator(s) described herein may be implemented (wholly or in part) by any program modules 428-430 and/or operating system 426 in FIG. 4 or a portion thereof.

The operating environment is only an example of a suitable operating environment and is not intended to suggest any limitation as to the scope or use of functionality of the exemplary hardware-based software authenticator(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Processor-Readable Media

An implementation of an exemplary hardware-based software authenticator may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media, implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

CONCLUSION

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. One or more computer storage media having processor-executable instructions that, when executed by a processor, perform acts comprising:
   querying a multi-function hardware device that is coupled to a computer, the multi-function hardware device configured to perform more than one computing function, wherein at least one of those computing functions is unrelated to an authentication function, and the querying includes validating that the multi-function hardware device is a specific one designated to authorize use of a software product stored on the one or more computer storage media;
   obtaining a response to the query;
   determining if the response is authentic, which means that the hardware device is directly associated with the software product;
   in response to an authentic response, granting full access to a set of functionality of the software product.

2. One or more computer storage media as recited in claim 1 further comprising, in response to an inauthentic response, restricting access to a set of functionality of the software product.

3. One or more computer storage media as recited in claim 1, further comprising restricting access to a set of functionality of the software product if no response is received within a defined time period.

4. A computer comprising the one or more computer storage media as recited in claim 1.

5. One or more computer storage media having processor-executable instructions that, when executed by a processor, perform acts comprising:
   querying a multi-function hardware device that is coupled to a computer, the multi-function hardware device configured to perform more than one computing function, wherein at least one of those computing functions is unrelated to an authentication function, and the querying includes validating that the multi-function hardware device is a specific one designated to authorize use of a software product stored on the one or more computer storage media through use of a key infrastructure;
   obtaining a response to the query;
   determining if the response is authentic, which means that the hardware device is directly associated with the software product;
   in response to an authentic response, granting full access to a set of functionality of the software product;
   in response to an inauthentic response, restricting access to a set of functionality of the software product.

6. One or more computer storage media as recited in claim 5, further comprising restricting access to a set of functionality of the software product if no response is received within a defined time period.

7. A computer comprising the one or more computer storage media as recited in claim 5.

8. A system comprising:
   a querying means for querying a multi-function hardware device that is coupled to a computer, the multi-function hardware device configured to perform more than one computing function, wherein at least one of those computing functions is unrelated to an authentication function, and the querying includes validating that the multi-function hardware device is a specific one designated to authorize use of a software product stored on one or more computer storage media through use of a key infrastructure;
   an obtaining means for receiving a response to the query;
   an authentication means for determining if the response is authentic, which means that the hardware device is directly associated with a software product; and
   a granting means for granting full access to a set of functionality of the software product in response to an authentic response; or
   a restricting means for restricting access to a set of functionality of the software product in response to an inauthentic response.

9. A method comprising:
   querying a multi-function hardware device that is coupled to a computer, the multi-function hardware device configured to perform more than one computing function, wherein at least one of those computing functions is unrelated to an authentication function, and the querying includes validating that the multi-function hardware device is a specific one designated to authorize use of a software product stored on one or more computer storage media through use of a key infrastructure;
   obtaining a response to the query;
   determining if the response is authentic, which means that the hardware device is directly associated with a software product;
   in response to an authentic response, granting full access to a set of functionality of the software product;
   in response to an inauthentic response, restricting access to a set of functionality of the software product.

10. A method as recited in claim 9, further comprising restricting access to a set of functionality of the software product if no response is received within a defined time period.

11. One or more computer storage media having processor-executable instructions that, when executed by a processor, perform acts comprising:
   querying a hardware device on a remotely coupled computer, the device being coupled to the remotely coupled computer, and the querying includes validating that the hardware device is a specific one designated to authorize use of a software product stored on the one or more computer storage media on a local computer;
   obtaining a response to the query from the remotely coupled computer;
   determining if the response is authentic, which means that the hardware device is directly associated with the software product;
   in response to an authentic response, granting the remotely coupled computer full access to a set of functionality of the software product on a local computer.

12. One or more computer storage media as recited in claim 11, further comprising, in response to an inauthentic response, restricting access of the remotely coupled computer to a set of functionality of the software product on a local computer.

13. One or more computer storage media as recited in claim 11, further comprising restricting access for the remotely coupled computer to a set of functionality of the software product on a local computer if no response is received within a defined time period.

14. One or more computer storage media as recited in claim 11, wherein the software product consists of non-executable data content.

15. A computer comprising the one or more computer storage media as recited in claim 11.

16. One or more computer storage media as recited in claim 1, wherein the validating includes use of a key infrastructure.

17. One or more computer storage media as recited in claim 11, wherein the validating includes use of a key infrastructure.

* * * * *

UNITED STATES PATENT AND TRADEMARK OFFICE
CERTIFICATE OF CORRECTION

| | | |
|---|---|---|
| PATENT NO. | : 7,516,495 B2 | |
| APPLICATION NO. | : 10/938323 | |
| DATED | : April 7, 2009 | |
| INVENTOR(S) | : Charles H. Shoemaker et al. | |

It is certified that error appears in the above-identified patent and that said Letters Patent is hereby corrected as shown below:

In column 2, line 41, before "DESCRIPTION" insert -- BRIEF --.

Signed and Sealed this
Third Day of May, 2011

David J. Kappos
*Director of the United States Patent and Trademark Office*